US010060543B2

(12) United States Patent
Manger et al.

(10) Patent No.: US 10,060,543 B2
(45) Date of Patent: Aug. 28, 2018

(54) ADJUSTABLE DAMPING VALVE DEVICE

(71) Applicant: ZF Friedrichshafen AG, Friedrichshafen (DE)

(72) Inventors: Thomas Manger, Wasserlosen (DE); Stefan Schmitt, Gochsheim (DE); Lukas Ruhmann, Memmelsdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/500,648

(22) PCT Filed: Jun. 29, 2015

(86) PCT No.: PCT/EP2015/064628
§ 371 (c)(1),
(2) Date: Jan. 31, 2017

(87) PCT Pub. No.: WO2016/015932
PCT Pub. Date: Feb. 4, 2016

(65) Prior Publication Data
US 2017/0219109 A1 Aug. 3, 2017

(30) Foreign Application Priority Data

Aug. 1, 2014 (DE) .................. 10 2014 215 199

(51) Int. Cl.
*F16K 17/04* (2006.01)
*F16K 17/10* (2006.01)
(Continued)

(52) U.S. Cl.
CPC ............ *F16K 17/0433* (2013.01); *F16F 9/14* (2013.01); *F16F 9/34* (2013.01); *F16K 17/105* (2013.01); *F16F 9/464* (2013.01)

(58) Field of Classification Search
CPC .... F16K 15/044; F16K 31/0655; F16K 17/06; G05D 16/04; G05D 16/02; F16F 9/46;
(Continued)

(56) References Cited

U.S. PATENT DOCUMENTS 5,004,079 A * 4/1991 Ivers ..................... F16F 9/46
188/266.5
5,078,240 A * 1/1992 Ackermann ............ F16F 9/465
188/282.2
(Continued)

FOREIGN PATENT DOCUMENTS

DE 4104110 8/1992
DE 19624897 1/1998
(Continued)

*Primary Examiner* — William McCalister
(74) *Attorney, Agent, or Firm* — Cozen O'Connor

(57) ABSTRACT

An adjustable damping valve device for a vibration damper, includes a main stage valve which is controlled by a pre-stage valve which is functionally connected in series with the emergency operation valve. A pressure relief valve having the constructional form of a seat valve is arranged inside the emergency operation valve and is functionally connected in parallel with the emergency operation valve. A valve body of the pressure relief valve is formed by at least one annular valve disk.

9 Claims, 4 Drawing Sheets

(51) Int. Cl.
*F16F 9/14* (2006.01)
*F16F 9/34* (2006.01)
*F16F 9/46* (2006.01)

(58) Field of Classification Search
CPC ........ F16F 9/464; F16F 9/465; F16F 2230/24; F16F 5/00; F16F 6/00; F16F 7/00; F16F 9/00; F16F 9/14; F16F 9/34; F16F 15/02; F16F 15/023; F16F 15/03; F16F 2222/06; F16F 2222/12; B60G 17/06; B60G 17/08; Y10T 137/7793
See application file for complete search history.

(56) References Cited

U.S. PATENT DOCUMENTS

| | | | | |
|---|---|---|---|---|
| 5,163,706 A * | 11/1992 | Maguran, Jr. | ........... | F16F 9/465 137/854 |
| 5,303,804 A * | 4/1994 | Spiess | .................... | F16F 9/465 188/266.5 |
| 5,398,787 A * | 3/1995 | Woessner | ............... | B60G 17/08 188/266.6 |
| 5,464,079 A * | 11/1995 | Lohberg | ................. | B60G 17/08 188/280 |
| 5,850,896 A * | 12/1998 | Tanaka | .................... | F16F 9/465 188/266.2 |
| 5,937,975 A * | 8/1999 | Forster | .................... | F16F 9/463 188/266.6 |
| 6,000,508 A * | 12/1999 | Forster | ..................... | F16F 9/46 188/299.1 |
| 6,035,979 A * | 3/2000 | Forster | ..................... | F16F 9/34 188/266.6 |
| 6,273,224 B1 * | 8/2001 | Achmad | .................. | F16F 9/34 188/266.5 |
| 6,305,512 B1 * | 10/2001 | Heinz | ...................... | F16F 9/46 188/266.6 |
| 6,352,144 B1 * | 3/2002 | Brooks | .................... | F16F 9/34 137/909 |
| 9,310,810 B2 | 4/2016 | Förster | | |
| 2010/0252766 A1 * | 10/2010 | Forster | ................... | F16F 9/464 251/129.15 |
| 2012/0187778 A1 * | 7/2012 | Foster | .................... | F16F 9/464 310/12.01 |
| 2012/0205567 A1 * | 8/2012 | Forster | ................... | F16F 9/464 251/129.15 |
| 2013/0015028 A1 * | 1/2013 | Heyn | ..................... | F16F 9/464 188/322.13 |
| 2013/0248021 A1 * | 9/2013 | Forster | ................... | F16F 9/464 137/529 |
| 2013/0340865 A1 * | 12/2013 | Manger | ................... | F16F 9/464 137/561 R |
| 2013/0341142 A1 * | 12/2013 | Forster | ................... | F16F 9/464 188/322.15 |
| 2013/0341540 A1 * | 12/2013 | Manger | ................... | F16F 9/46 251/30.01 |
| 2014/0090733 A1 * | 4/2014 | Sauerbrey | .......... | F16K 31/0655 137/613 |

FOREIGN PATENT DOCUMENTS

DE 102010063386 6/2012
DE 102012210462 1/2013

* cited by examiner

ADJUSTABLE DAMPING VALVE DEVICE

PRIORITY CLAIM

This is a U.S. national stage of application No. PCT/EP2015/064628, filed on Jun. 29, 2015. Priority is claimed on the following application: Country: Germany, Application No.: 10 2014 215 199.6, Filed: Aug. 1, 2014; the content of which is/are incorporated herein in its entirety by reference.

FIELD OF THE INVENTION

The invention is directed to an adjustable damping valve device which includes a pressure relief valve functionally connected in parallel with an emergency operation valve.

BACKGROUND OF THE INVENTION

An adjustable damping valve device comprising a pre-stage valve and a main stage valve is known from U.S. Pat. No. 9,310,810. Further, an emergency operation valve which occupies an emergency operation position during an outage of the power supply for an actuator of the damping valve device is connected in series with the pre-stage valve. At least one pressure relief valve which opens in the event of overpressure in a control space of the damping valve device and accordingly determines a maximum damping force setting is in turn connected in parallel with the emergency operation valve.

The at least one pressure relief valve is arranged in the emergency operation valve. Small pressure relief valves which can be screwed into the emergency operation valve, for example, can be provided for this purpose taking into account the required installation space. Pressure relief valves of this type are available as constructional units and are comparatively inexpensive. However, owing to the small constructional shape, they are comparatively sensitive to manufacturing tolerances, e.g., in the closing spring. While this problem can be compensated with an adjustable supporting surface for the closing spring, the realizable volume flows through an individual pressure relief valve are comparatively small. Consequently, a plurality of pressure relief valves must be provided, which increases expenditure on assembly.

It is thus an object of the present invention to provide a damping valve device in which a pressure relief valve for a damping valve device can have low expenditure on assembly and a comparatively large flow cross section.

SUMMARY OF THE INVENTION

This object is met according to the invention in that a valve body of the pressure relief valve is formed by at least one annular valve disk.

The great advantage of the present invention consists in that, on the one hand, a large pressure-impinged surface is available at the valve disk and, on the other hand, a large outflow cross section is also possible during a lifting movement.

It is provided in a further advantageous arrangement that the emergency operation valve has a guide body which has a valve seat surface for the valve disk. Therefore, the guide body is part of the pressure relief valve.

In principle, the valve disk can also be preloaded by a separate closing spring. However, a construction in which the valve disk is elastically constructed and is held by clamping device is particularly space-saving.

According to an advantageous embodiment, the clamping device is formed by an emergency operation valve body. By dividing in two, the valve disk can be clamped between the clamping device and the guide body and form a simple manageable constructional unit.

The emergency operation valve body preferably has an annular base shape which is connected to the guide body. The emergency operation valve body can be mounted in any orientation in circumferential direction. Further, because of the annular shape, the emergency operation valve body has an advantageous size which can be gripped easily by an assembly device or tool.

In addition, the emergency operation valve body has a clamping area which, together with a receiving area of the guide body, forms an overpressure channel which is covered by the valve disk. Owing to the clamping area, a complicated threaded connection or a welding of the emergency operation valve body to the guide body can be dispensed with. Further, a specific adjustment of the preloading of the valve disk can be achieved by a simple axial displacement of the emergency operation valve body relative to the guide body.

To minimize production expenditure, the emergency operation valve body has at least one axial cutout which forms the overpressure channel. An axial cutout can be produced easily.

To achieve a particularly large pressure-impinged surface at the valve disk, the overpressure channel opens into an annular space which is covered by the at least one valve disk.

The annular space is formed by an offset of the guide body and, therefore, can also be produced without an undercut.

In a preferred embodiment, a damping valve housing has a housing insert which is separate from the damping valve housing and in which the main stage valve body of the main stage valve is guided, this housing insert being constructed in a pot-shaped manner, and a valve seat surface of the emergency operation valve is formed by the housing insert. This simplifies the production of the entire damping valve housing.

In a further advantageous embodiment, the valve seat surface is constructed at a radial distance from a profiling of the housing insert which forms a flow channel within the damping valve device.

BRIEF DESCRIPTION OF THE DRAWINGS

The invention will be described in more detail with reference to the following drawings in which.

DETAILED DESCRIPTION OF THE PRESENTLY PREFERRED EMBODIMENTS

Figure 1A:
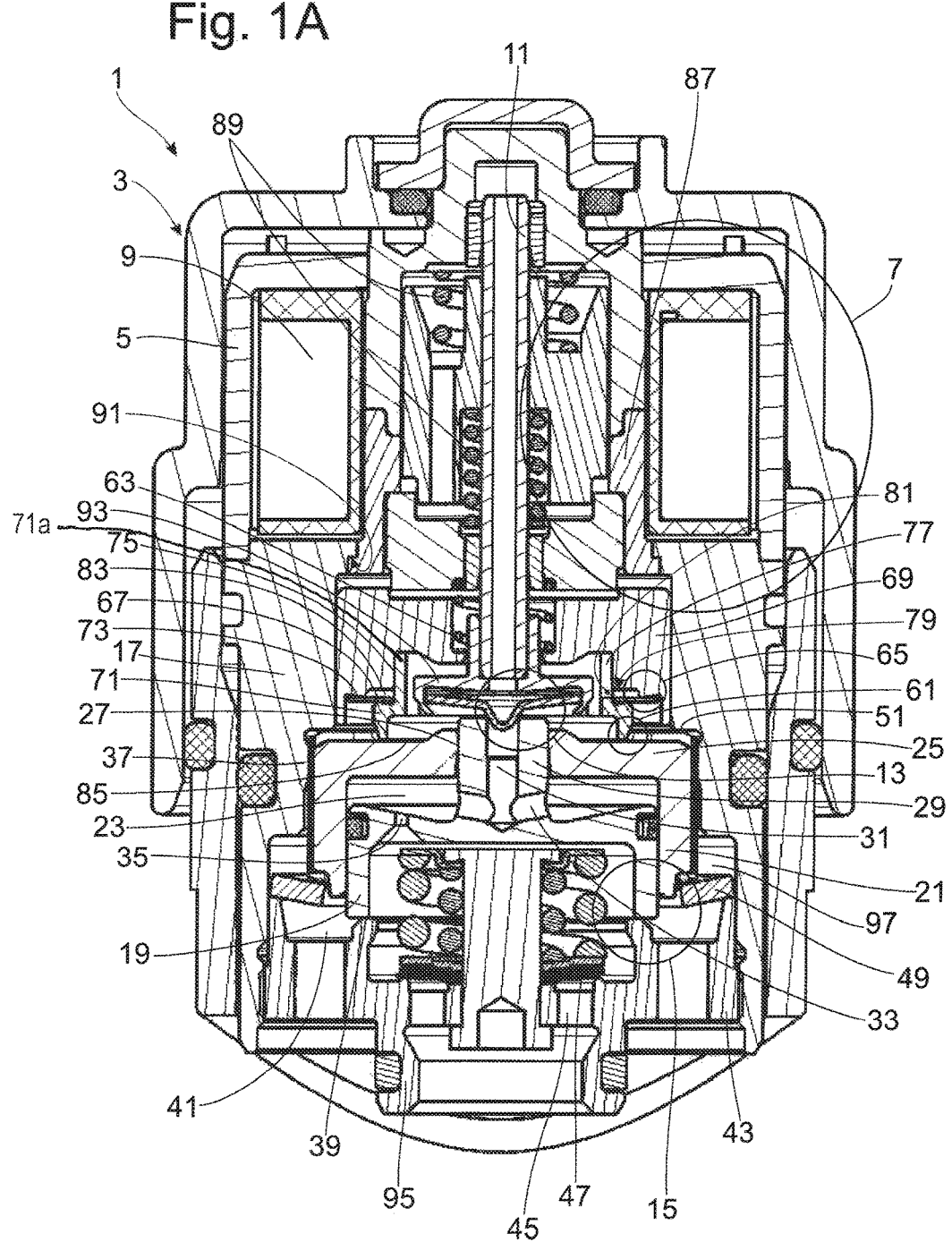
FIG. 1A is a cross-sectional view through a damping valve device of the present invention.

FIG. 1 shows a damping valve device 1 with a damping valve housing 3 for a vibration damper of any constructional type, this damping valve housing 3 being divided in two axially. In the present configuration, the damping valve device 1 is provided for external arrangement with respect to an outer cylinder of the vibration damper, but the construction principle can easily be adapted, e.g., to a piston rod on a damping valve device. An actuator 7, known per se, which comprises a coil 9 acting on a pre-stage valve 13 via an armature 11 is arranged in a first damping valve housing portion 5. A main stage valve 15 which generates the damping force in the vibration damper is controlled with the pre-stage valve 13. The pre-stage valve 13 and the main stage valve 15 are arranged in the second damping valve housing portion 17 which has a tubular base shape without an intermediate wall.

The main stage valve 15 comprises a main stage valve body 19 which is guided so as to be axially movable in a housing insert 21 which is separate from the damping valve housing 3. The housing insert 21 is constructed in a pot-shaped manner and forms a control space 23 via which the main stage valve 15 is controlled by the pre-stage valve 13. A base 25 of the housing insert 21 has an opening 27 in which a guide shaft 29 of the main stage valve body 19 is guided. Extending in the guide shaft 29 are an axial channel 31 and a transverse channel 33 which connect the control space 23 to the pre-stage valve 13 via a passage 35 in the base 25.

Figure 1B:
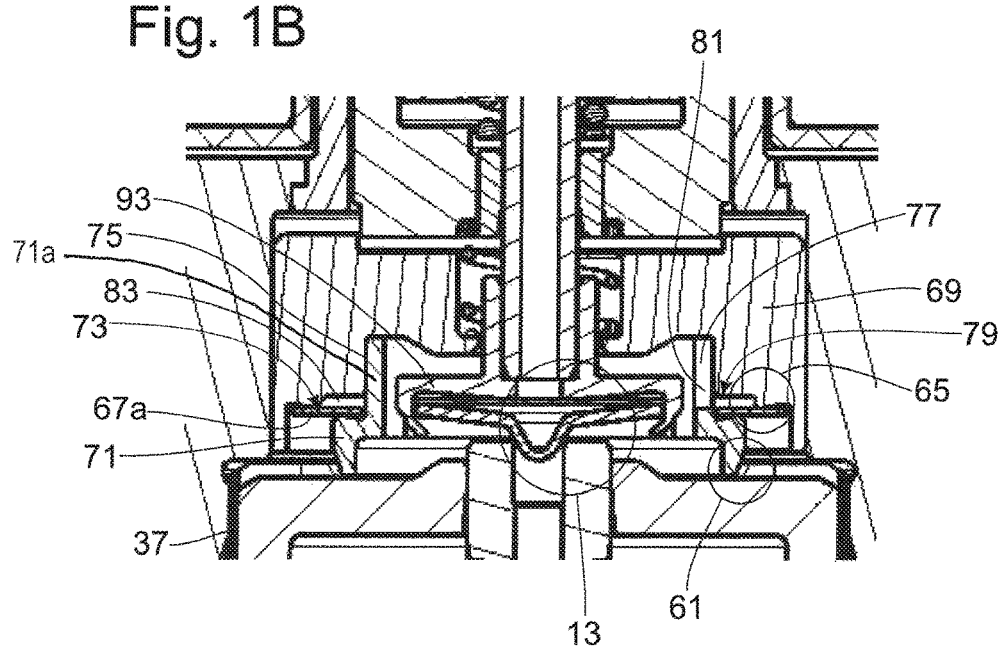
FIG. 1B is an enlarged cross-sectional view of a section of FIG. 1A with open pre-stage valve body and open emergency operation valve body.
Figure 1C:
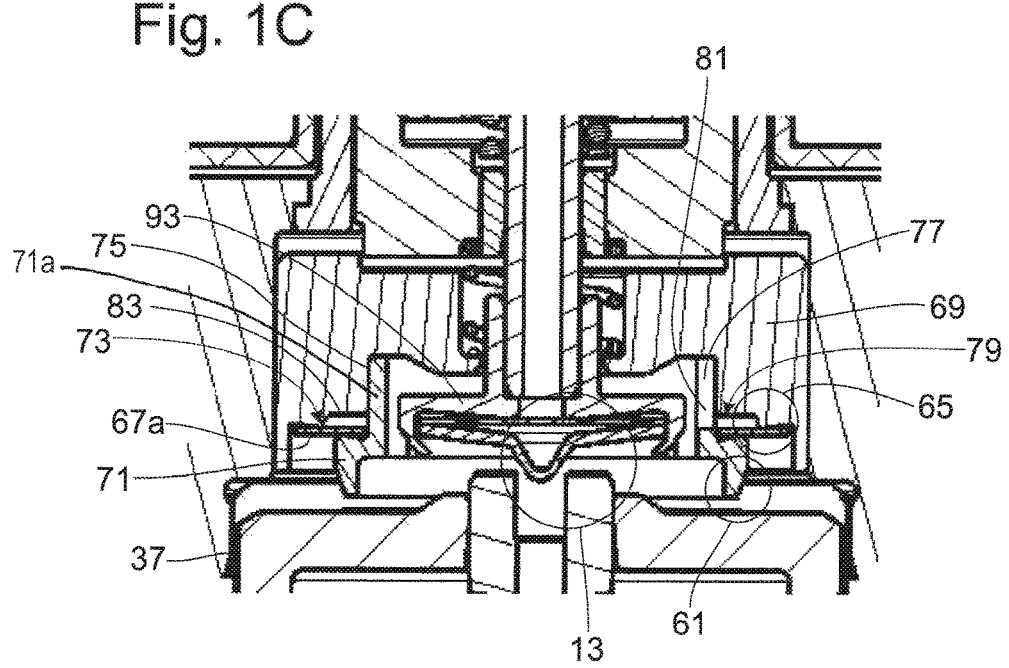
FIG. 1C is an enlarged cross-sectional view of a section of FIG. 1A with open pre-stage valve body and open emergency operation valve body.
Figure 1D:
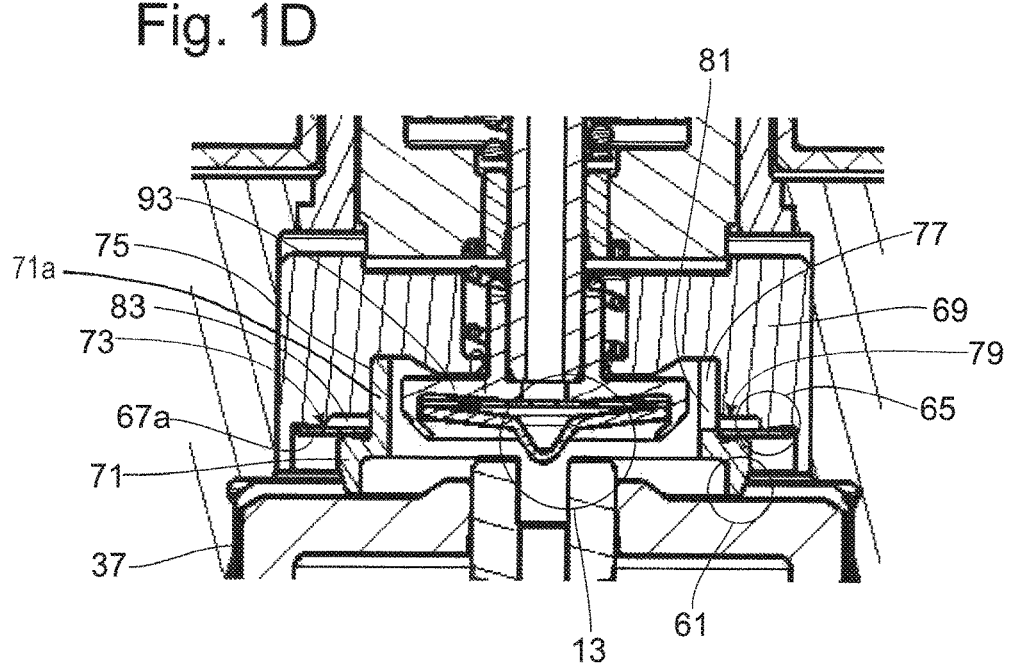
FIG. 1D is an enlarged cross-sectional view of a section of FIG. 1A with open pre-stage valve body and closed emergency operation valve body.
Figure 1E:
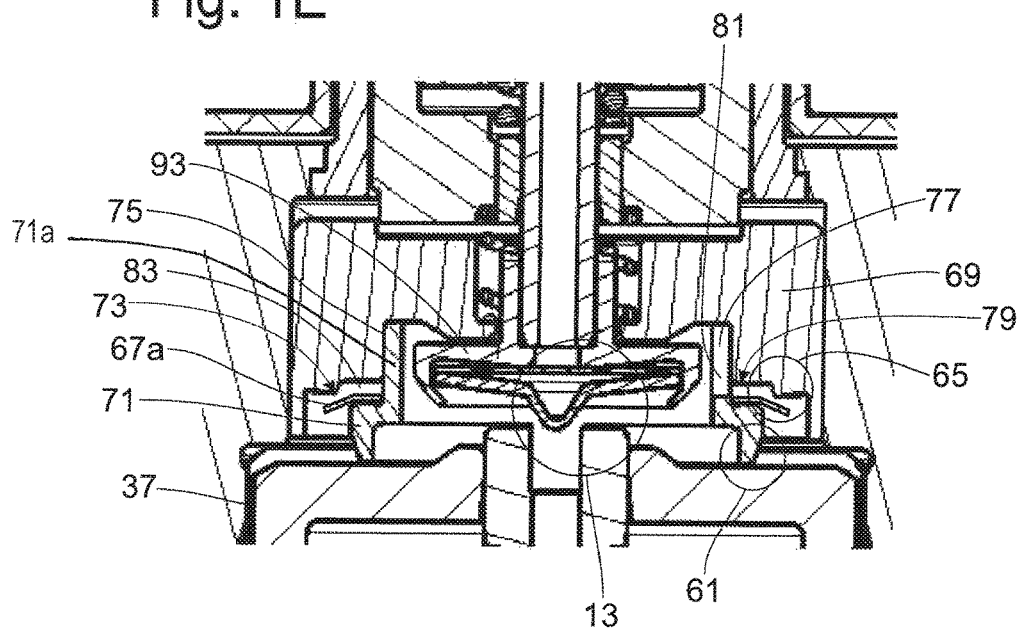
FIG. 1E is an enlarged cross-sectional view of a section of FIG. 1A with open pre-stage valve body and closed emergency operation valve body and open pressure relief valve.
Figure 2:
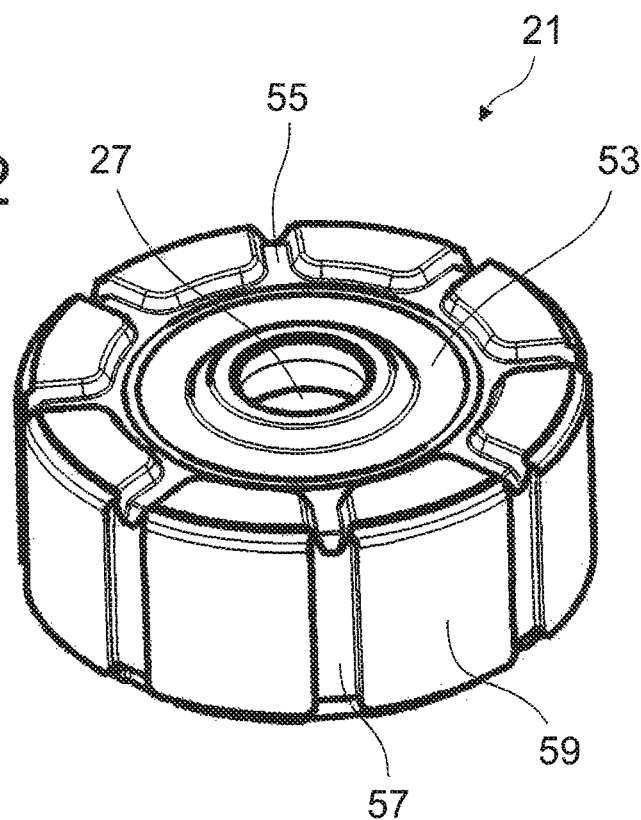
FIGS. 2 and 3 are two perspective views of a housing insert.
Figure 3:
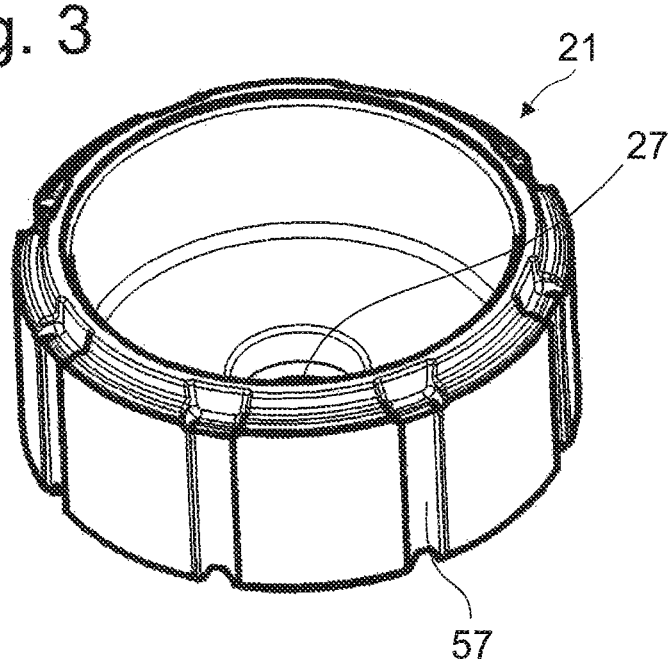

As a comparison of FIGS. 1 to 3 will illustrate, the housing insert 21 has a profiling on the outer side. In this way, opposed surfaces of the damping valve housing 3 and of the housing insert 21 form at least one flow channel 37 for a flow of damping medium inside the damping valve device 1.

The main stage valve 15 is constructed as a seat valve so that the main stage valve body 19 rests on a main stage valve seat surface 39. At least one through-channel 41 which is arranged radially inside of the damping valve housing 3 is formed radially outwardly of the main stage valve seat surface 39. The flow channel 37 present at the outer side of the housing insert 21 is connected to the at least one through-channel 41.

The main stage valve seat surface 39 is in turn formed by a valve insert 43 via which the housing insert 21 is axially positioned in the damping valve housing 3. In the present embodiment, the valve insert 43 has damping channels 45 which cooperate with at least one valve disk 47. However, this is optional.

The housing insert 21 is preloaded axially against a supporting surface 51 of the damping valve housing 3 by a spring element 49 constructed as a disk spring. The spring element 49 is in turn supported at the valve insert 43.

FIGS. 2 and 3 show the housing insert 21 as individual part in different external views. The top view shows a central annular channel 53 to which a plurality of radial channels 55 are connected. These radial channels 55 merge into axial grooves 57 in an outer lateral surface 59 of the housing insert. When the radial channels 55 and axial grooves 57 are produced, e.g., without cutting, in a pressing process, it is useful to provide channels 55 and grooves 57 as numerously and in as flat a manner as possible to minimize dimensional deviations at the housing insert 21 which are brought about by the production process.

In principle, a damping valve device 1 would be capable of operating with a main stage valve 15 and a pre-stage valve 13. Particularly in case the actuator 7 can no longer be supplied with power, there is the option of using an emergency operation valve 61 which is functionally connected in series with the pre-stage valve 13. During power failure, the emergency operation valve 61 occupies a closed position due to a closing spring 63. A residual cross section then determines the pressure in the control space 23 which in turn influences the closing force on the main stage valve body 19. The above-mentioned residual cross section can be zero or can have a definite size.

As shown in the Figures, a pressure relief valve 65 constructed in the form of a seat valve is functionally connected in parallel with the emergency operation valve 61 and is arranged inside the emergency operation valve 61. The pressure relief valve 65 has a valve body 67 which is formed by at least one annular valve disk. The emergency operation valve 61 comprises a guide body 69 and an emergency operation valve body 71a. A valve seat surface 73 for the at least one valve disk 67a is constructed at the guide body 69. In this embodiment, the valve disk 67a is elastic and is held by a clamping device 71. The emergency operation valve body 71a with its annular base shape via which it is connected to the guide body 69 functions as clamping device 71. To this end, the emergency operation valve body 71a has a clamping area 75 with at least one axial cutout 77 which, together with a receiving region 79 of the guide body 69, forms an overpressure channel 81 which is covered by the valve disk 67. In this constructional variant, the overpressure channel 81 opens into an annular space 83 which is covered by the at least one valve disk 67a. The annular space 83 itself is formed by an offset of the guide body 69.

Referring back to FIG. 1A, a valve seat surface 85 of the emergency operation valve 61 is formed by the housing insert 21 and the annular groove 53 (FIG. 2), respectively, such that the valve seat surface 85 is formed at a radial distance from the profiling 55 of the housing insert 21.

As can be seen from FIG. 1, the second damping valve housing portion 17 is constructed not only to be tubular but also with a stepped inner contour which increases in size without offsets proceeding from a first end at actuator 7 in direction of a second end in the region of the valve insert 43. This affords the possibility that the assembly can be carried out in one assembly direction via the large opening at the second end.

During assembly, a back-iron body 87 with armature 11, including a spring arrangement 89 of the actuator 7, is first inserted into the second damping valve housing portion 17 via the second end. The back-iron body 87 is supported at a circumferential projection 91 exhibiting the smallest inner diameter of the tubular body 17. Subsequently, a pre-stage valve body 93 is placed on the armature 11.

The emergency operation valve 61, i.e., the constructional unit comprising guide body 69, at least one valve disk 67a and the emergency operation valve body 71a, is then mounted together with the closing spring 63 for the emergency operation valve.

The housing insert 21 which contacts the supporting surface 51 of the second damping valve housing portion 17 in its end position is inserted in a further assembly step. In the next assembly step, the main stage valve body 19 is inserted into the housing insert 21 as the case may be. This is followed by the spring element 49. The damping valve housing 3 is terminated by the valve insert 43 which is fastened to the second damping valve housing portion 17, e.g., by a threaded connection.

During a working movement of the vibration damper, damping medium is displaced into the damping valve device 1 via a tube connection 95 of the valve insert 43. In so doing, the damping medium passes the at least one damping channel 45 and the at least one valve disk 47. Accordingly, a lifting force acts on the main stage valve body 19. The damping medium arrives in the control space 23 via passage 35 and accordingly exerts a closing force on the main stage valve body 19. As shown, the pre-stage valve 13 controls an outflow cross section out of the control space 23 into the flow channel 37 between housing insert 21 and second damping valve housing portion 17. When the power supply is intact, the emergency operation valve 61 occupies a through-position in which the emergency operation valve body 71a is lifted from the valve seat surface 85 (FIG. 1C). The damping medium flowing out reaches an annular space 97 between the second damping valve housing valve portion 17 and the valve insert 43 via the flow channel 37, and the damping medium of the pre-stage valve 13 flows out via the at least one through-channel 41 thereof.

During disruption of the power supply for the actuator 7, the emergency operation valve 61 occupies a closed position in which the emergency operation valve body 71a rests on the valve seat surface 85 as is shown in FIG. 1(B). Subsequently, only a small closing force of the spring arrangement 89 acts on the pre-stage valve 13 so that a slight control pressure in the control space 23 is sufficient to open the pre-stage valve 13. A maximally soft damping force setting is prevented by the closed emergency operation valve 61. On the other hand, the pressure relief valve 65 connected in parallel with the emergency operation valve 61 prevents an excessively high control pressure. As shown in FIG. 1D the damping medium passes from the pre-stage valve 13 through the overpressure channel 81 to the annular space 83 in front of the pressure relief valve 65 which as shown in FIG. 1E opens in that the elastic valve seat 67a is lifted from the valve seat surface 73 at the guide body 69. The continued flow path is then identical to the flow path when the actuator is operative.

During a lifting movement of the main stage valve body 19 from its main stage valve seat surface 39, damping medium flows radially outward and likewise flows out of the damping valve housing 3 via the at least one through-channel 41. The damping medium then flows into a compensation space or working space, not shown.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An adjustable damping valve device for a vibration damper comprising:
    a main stage valve (15);
    an emergency operation valve (61) comprising a guide body (69);
    a pre-stage valve (13) for controlling the main stage valve (15), the pre-stage valve (13) being functionally connected in series with the emergency operation valve (61);
    a pressure relief valve (65) constructed as a seat valve arranged inside the emergency operation valve (61) and functionally connected in parallel with the emergency operation valve; and wherein the pressure relief valve comprises a valve body (65) formed by at least one annular valve disk (67a); the guide body (69) having a valve seat surface (73) for the valve disk (67a);
    the adjustable damping valve additionally comprising a clamping device (71); and wherein the valve (67a) is elastically constructed and is held by the clamping device (71).

2. The adjustable damping valve device according to claim 1, wherein the clamping device (71) is formed as an emergency operation valve body (71a).

3. The adjustable damping valve device according to claim 2, wherein the emergency operation valve body (71a) has an annular base shape connected to the guide body (69).

4. The adjustable damping valve device according to claim 3, wherein the guide body (69) comprises a receiving area (79) and wherein the emergency operation valve body (71a) has a clamping area (75) which, together with the receiving area (79) of the guide body (69), forms an overpressure channel (81) which is covered by the valve disk (67).

5. The adjustable damping valve device according to claim 4, wherein the emergency operation valve body (71a) has at least one axial cutout (77) which forms the overpressure channel (81).

6. The adjustable damping valve device according to claim 4, wherein the guide body (69) comprises an annular space (83) and wherein the overpressure channel (81) opens into the annular space (83) which is covered by the at least one valve disk (67).

7. The adjustable damping valve device according to claim 6, wherein the annular space (83) is formed by an offset of the guide body (69).

8. The adjustable damping valve device according to claim 1, additionally comprising:
    a damping valve housing (3);
    the main stage valve (15) comprising a main stage valve body (19); wherein the damping valve housing (3) has a housing insert (21) which is separate from the damping valve housing (3) and in which the main stage valve body (19) is guided, wherein the housing insert (21) is constructed in a pot-shaped manner, and a valve seat surface (85) of the emergency operation valve (61) is formed by the housing insert (21).

9. The adjustable damping valve device according to claim 8, wherein the valve seat surface (85) is constructed at a radial distance from a profiling (55) of the housing insert (21) which forms a flow channel (37) within the damping valve device (1).

* * * * *